United States Patent [19]

Bousaid et al.

[11] 4,266,611
[45] May 12, 1981

[54] OIL RECOVERY METHOD EMPLOYING ALTERNATE SLUGS OF SURFACTANT AND FRESH WATER SOLUTION OF POLYMER

[75] Inventors: Issam S. Bousaid; Benny K-C Ho, both of Houston, Tex.

[73] Assignee: Texaco Inc., White Plains, N.Y.

[21] Appl. No.: 71,218

[22] Filed: Aug. 30, 1979

[51] Int. Cl.³ .............................................. E21B 43/22
[52] U.S. Cl. ..................................... 166/273; 166/274
[58] Field of Search ............ 166/273, 274, 275, 305 R

[56] References Cited

U.S. PATENT DOCUMENTS

| 3,346,047 | 10/1967 | Townsend et al. | 166/273 |
| 3,352,358 | 11/1967 | Williams, Jr. | 166/273 |
| 3,410,341 | 11/1968 | Brigham et al. | 166/273 |
| 3,421,582 | 1/1969 | Fallgatter | 166/273 |
| 3,500,920 | 3/1970 | Raifsnider | 166/273 |
| 3,500,922 | 3/1970 | O'Brien et al. | 166/273 |
| 3,612,182 | 10/1971 | Raifsnider | 166/273 X |
| 4,157,306 | 6/1979 | Kalfoglou et al. | 166/273 X |

*Primary Examiner*—James A. Leppink
*Assistant Examiner*—George A. Suchfield
*Attorney, Agent, or Firm*—Carl G. Ries; Robert A. Kulason; Jack H. Park

[57] ABSTRACT

Disclosed is a petroleum recovery method for recovering petroleum from subterranean formations containing water having high salinity and/or divalent ion concentration, employing an aqueous surfactant-containing fluid which is designed to effect low surface tension displacement of petroleum in the formation in the presence of high salinity water. The improvement comprises injecting the total desired volume of surfactant in the form of a plurality of relatively small slugs of surfactant fluid, and alternatingly injecting similarly small pore volume slugs of fresh, low salinity solution of hydrophilic polymer. The total pore volume of surfactant-containing fluid injected is ordinarily from 0.01 to 1.00 and preferably from 0.20 to 0.50 pore volumes. This total amount of surfactant fluid is injected in from 2 to 15 and preferably from 3 to 6 separate discrete slugs.

Each slug of surfactant fluid is followed by injecting a quantity of low salinity, relatively fresh water solution of polymer, e.g. of salinity less than about 10,000 and preferably less than 1000 parts per million total dissolved solids. The volume of each slug of lower salinity polymer solution is ordinarily from 0.5 to 5.0 and preferably 1 to 2 times the volume of the preceding surfactant fluid slug.

27 Claims, No Drawings

OIL RECOVERY METHOD EMPLOYING ALTERNATE SLUGS OF SURFACTANT AND FRESH WATER SOLUTION OF POLYMER

FIELD OF THE INVENTION

This invention concerns a surfactant water-flooding petroleum recovery process.

BACKGROUND OF THE INVENTION

Petroleum is found in subterranean formations or reservoirs in which it has accumulated, and recovery is initally accomplished by pumping or permitting the petroleum to flow to the surface of the earth through wells drilled to and in fluid communication with the subterranean reservoirs. Petroleum can be recovered from the subterranean formations only if certain conditions exist. There must be an adequately high concentration of petroleum in the formation, and there must be adequate permeability or interconnected flow channels throughout the formation to permit the flow of fluid therethrough if sufficient pressure is applied to the fluid. When the subterranean, petroleum-containing formation has natural energy present in the form of an active, underlying or edge water drive, solution gas, or a high pressure gas cap above the petroleum within the reservoir, the natural energy is utilized to recovery petroleum in what is commonly referred to as primary recovery. In this primary phase of petroleum recovery, petroleum flows to wells drilled into and completed in the formation, the petroleum being displaced through the formation toward the wells by the naturally occurring energy in the reservoir. When the natural energy source is depleted, or in the instance of those formations which do not originally contain sufficient natural energy to permit primary recovery operations, some form of supplemental recovery process must be applied to the reservoir. Supplemental recovery is frequently referred to as secondary or tertiary recovery, although in fact it may be primary, secondary or tertiary in sequence of employment. Petroleum recovery operations involving the injection of water into the formation to displace petroleum toward the production well, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this limitation of waterflooding and many additives have been described in the literature for incorporating in the flood water for the purpose of decreasing the interfacial tension between the injection water and the formation petroleum. For example, petroleum sulfonates have been disclosed in many references for use in oil recovery operations, but petroleum sulfonates have limitations with respect to formation water salinity, hardness and other factors which frequently restrict their usefulness. U.S. Pat. No. 3,811,504 describes a three component surfactant system comprising an anionic surfactant such as an alkyl or alkylaryl sulfonate plus a nonionic surfactant such as a polyethoxylated alkylphenol plus an alkylpolyethoxy sulfate. U.S. Pat. No. 3,811,505 describes a dual surfactant system employing an anionic surfactant such as an alkyl or alkylaryl sulfonate or phosphate, plus a nonionic surfactant such as polyethoxylated alkylphenol or polyethoxylated aliphatic alcohol. These systems permit the use of a surfactant flooding process in formations containing from 500 to 12,000 parts per million polyvalent ions such as calcium and magnesium. The foregoing process employing nonionic surfactants such as ethoxylated and sulfated surfactants are effective at high salinities, but have a limited temperature tolerance range. Surfactant waterflooding processes employing alkylpolyalkoxyalkylene sulfonates or alkyarylpolyalkoxyalkylene sulfonates are described in U.S. Pat. Nos. 3,827,497; 3,890,239; and 4,018,278. These surfactant mixtures are especially suitable for use in surfactant waterflood operations being applied to formations whose temperatures exceed the useful limits of nonionic surfactants and polyethoxylated and sulfated surfactants, and are additionally effective for use in formations containing very high salinity formation water.

While the foregoing described surfactant water-flood oil recovery processes have produced various encouraging results in laboratory experiments, field application of these processes have generally been less successful than expected, and the amount of additional oil recovered has thus far been insufficient to justify the cost of the surfactant materials incorporated in the flood water. A substantial cause for the disappointing results obtained in field application of surfactant waterflood oil recovery processes described in the literature are believed to be the loss of surfactant from the aqueous surfactant fluid to the formation as the fluid passes through the flow channels of the formation. This loss of surfactant is at least in part related to the adsorption of the surface active agents from the aqueous fluid onto the mineral surface of the formation matrix. It is also believed that some loss of surfactant to the formation occurs as a consequence of surfactant fluid entering dead-end flow channels of the formation, and remaining trapped in those flow channels and unavailable for subsequent low surface tension displacement of petroleum as the fluids are displaced through the formation by the drive water.

The use of many additives has been described in the literature for the purpose of decreasing the amount of surfactant adsorbed by the formation, including water soluble salts of carbonates, phosphates, fluorides, as well as quaternary ammonium salts. Unfortunately, many of the most effective sacrificial agents cannot be employed in processes being applied to formations containing relatively high concentrations of divalent ions such as calcium and magnesium because of the precipitation of insoluble calcium or magnesium salts which occurs when the injected chemicals contact the hard formation water. In formations containing high concentrations of divalent ions, water soluble lignosulfonate salts and related compounds can be used to reduce adsorption of surfactant, but they are expensive and not entirely satisfactory for preventing loss of surfactant in the formation from the surfactant-containing fluid.

In view of the foregoing discussion, it can be appreciated that there is a significant unsatisfied commercial need for a surfactant waterflooding oil recovery method, especially one employing the synthetic surfactants which can be used in formations containing high salinity, hard water, without experiencing significant loss of surfactant from the surfactant-containing fluid to the formation mineral matrix. More particularly, there is a significant commercial need for a method of conducting a surfactant waterflooding oil recovery process in which the amount of additional oil recovered as a consequence of injecting the surfactant-containing fluid, is sufficient to justify the high cost of the surfactant waterflooding oil recovery process.

BRIEF DESCRIPTION OF THE PRIOR ART

U.S. Pat. No. 3,882,940 described a tertiary oil recovery process in which a surfactant-containing oil recovery fluid is followed by alternating cycles of injecting slugs of gas and slugs of water.

SUMMARY OF THE INVENTION

The present invention concerns a surfactant waterflooding oil recovery process, especially one employing a surfactant tolerant of relatively high concentrations of salinity and/or divalent ions in the formation water. Surfactants of the class suitable for use in this process include nonionic surfactants such as polyethoxylated alkanols and polyethoxylated alkylphenols. Another class of surfactant especially suitable for use in this invention comprises alkylpolyethoxy sulfates or alkylarylpolyethoxy sulfates, which are effective at salinity levels substantially greater than the above-described nonionic surfactant, so long as the formation temperature is less than about 160° F. Another especially preferred class of surfactant for use in the process of this invention comprises alkylpolyalkoxyalkylene sulfonates and alkylarylpolyalkoxyalkylene sulfonates, which are suitable for use in formations containing up to 200,000 parts per million total dissolved solids in the formation water, in formations whose temperatures are as high as 240° F. The foregoing surfactants may be used as substantially the only surfactant present in the surfactant fluid, or may be used in combination with an organic sulfonate surfactant such as petroleum sulfonate, alkyl sulfonate, or alkylaryl sulfonate. The use of these surfactants is generally described in numerous prior art references.

In applying the particular process of this invention, the total amount of surfactant-containing fluid to be injected into the formation is injected in the form of a plurality of separate, discrete slugs of surfactant fluid, alternatingly injecting similarly small slugs of an aqueous polymer fluid containing essentially no surfactant, the salinity of these polymer fluid slugs being substantially less than the salinity of the water in the formation and less than the salinity of the water in the surfactant slug. The salinity of the polymer fluid is no greater than 10,000 and preferably no greater than 1000 parts per million total dissolved solids. The polymer fluid contains from 100 to 2,000 and preferably from 500 to 1,500 parts per million hydrophilic polymer, such as polyacrylamide, partially hydrolyzed polyacrylamide, copolymers of acrylamide and acrylic acid or an acrylate, or a biopolymer or polysaccharide. Ordinarily from 2 to 15 and preferably from 3 to 6 separate slugs of surfactant are injected into the formation, the total volume of surfactant being from 0.01 to 1.00 and preferably from 0.20 to 0.50 pore volumes based on the pore volume of formation to be affected by the injected fluid. The number of slugs of polymer fluid injected alternatingly with the slugs of surfactant fluid will ordinarily be about the same as the number of surfactant slugs. The volume of each slug of polymer fluid will ordinarily be from 0.5 to 5 and preferably from 1 to 2 times the volume of the immediately preceding surfactant slug. It is frequently convenient to make each succeeding slug of surfactant and each slug of polymer fluid about the same, although this is not essential. If the surfactant fluid contains a surfactant or mixture of surfactant selected or blended to achieve optimum performance at about the same salinity as the water present in the formation, then the salinity of the surfactant fluid will ordinarily be from 50 to 100 and preferably from 80 to 100 percent of the salinity of the water present in the formation. After all of the slugs of surfactant fluid and slugs of polymer fluid are all injected into the formation, a quantity of water containing a viscosifying amount of a hydrophilic polymer or other material capable of increasing the viscosity of the fluid is injected immediately after the surfactant fluid to achieve a favorable mobility ratio which insures more efficient displacement of the surfactant fluid. This in turn is followed by injecting a quantity of drive water or brine sufficient to displace all of the injected fluids through the formation.

DETAILED DESCRIPTION OF THE INVENTION

Surfactant waterflooding oil recovery processes as have been described in many prior art references, generally involve injecting a single quantity of surfactant fluid into the formation. Whatever surfactant is utilized, this fluid is followed by injecting water or an aqueous mobility controlled fluid comprising water having dissolved therein a viscosifying amount of material such as a hydrophilic polymer, in order to insure favorable mobility ratio between the surfactant and subsequently-injected fluids necessary to achieve efficient sweep of the portion of the formation between the injection and production wells. As the injected surfactant-containing fluid passes through the flow channels of the formation, it displaces oil which is not displaced by waterflooding because of the presence of the interfacial tension-reducing chemical in the fluid, which accomplishes displacement of petroleum from flow channels of the formation not depleted by waterflooding. Unfortunately, the surfactant fluid remains in the formation for very long periods of time, and retention of surfactant by the formation mineral matrix is a problem which apparently affects virtually all surfactant waterflooding oil recovery processes. Moreover, surfactant waterflood processes designed for use in formations containing water whose salinity exceeds about 20,000 parts per million total dissolved solids employ relatively expensive synthetic surfactants which are effective for low surface tension oil recovery processes at the high salinity of the formation water, and these surfactants are adsorbed even more readily from the high salinity surfactant-containing fluid than are the simple organic sulfonates used in formations containing low salinity water.

We have discovered that surfactant losses can be reduced significantly in surfactant waterflooding processes being applied to formations containing water whose salinity exceeds 20,000 parts per million total dissolved solids if the surfactant is injected in the form of a plurality of relatively small slugs of surfactant fluid, with a similarly small slug of fresh water solutions of hydrophilic polymer between succeeding slugs of surfactant fluid. The amount of oil recovered from a portion of formation contacted by a surfactant fluid is increased significantly by following the process of this invention, as compared to a conventional surfactant waterflood oil recovery process employing essentially the same surfactant in the same concentration and using the same total amount of the surfactant fluid, except that the surfactant fluid is injected in the form of a single, large slug of surfactant fluid rather than the plurality of small slugs with alternating injection of slugs of polymer solution according to this process.

It is believed that there are two possible mechanisms, one or both of which may be responsible for the favorable results obtained by application of the process of this invention. One is based on the significantly lower ionic forces at the lower salinity water and lower divalent ions between the entrapped oil droplets and its environment, such as the matrix and fluids. By cyclically reducing the ionic forces within the flow channels, oil-water emulsions become free to move under the influence of injected fluids, and also some of the surfactant becomes available for subsequent use downstream from the injection well. The second possible explanation for the improvement relates to the resolubilization of surfactant which has been entrapped or adsorped, either chemically or chemisorbed, because of the lower ionic forces at the lower water salinity and low divalent ion concentration present in the portion of the formation each time it is contacted by the low salinity polymer fluid being injected sequentially between slugs of saline surfactant fluid. It is entirely possible that either of these mechanisms, or both, operate simultaneously to produce the observed increase in tertiary oil recovery by application of this process.

In applying the process of this invention, the total volume of surfactant fluid to be used will ordinarily be from 0.01 to 1.0 and preferably from about 0.20 to 0.50 pore volumes based on the pore volume of the portion of the formation to be contacted by the injected fluid. The number of slugs of surfactant used is from 2 to 15 and preferably from 3 to 6. The volume of each slug should be at least 5 percent and preferably at least 10 percent of the total volume of surfactant fluid used. The pore volume of each surfactant slug will be from 0.01 to 0.50 pore volumes and preferably from 0.05 to 0.20. The volume of each fresh, low salinity polymer solution slug will be from 0.01 to 1.0 and preferably from 0.05 to 0.5 pore volumes. As used throughout this application, pore volumes is based on the pore volume of the formation within the recovery zone defined by the injection and production wells.

If this process is to be applied to a formation containing relatively high salinity formation water, and/or water containing relatively high concentrations of divalent ions, the surfactant fluid will ordinarily contain one or more of the following surfactants.

(1) In application to formations whose temperature is less than about 125° F., nonionic surfactants may be employed advantageously and they are somewhat less expensive than the more complex surfactants to be described below. Examples of suitable nonionic surfactants for use in this embodiment of the process of my invention are listed below.

(a) polyethoxylated alkanols or alkylphenols having the following formula:

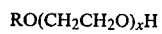

RO(CH$_2$CH$_2$O)$_x$H wherein R is an alkyl having from 5 to 20 and preferably from 8 to 16 carbon atoms, or an alkylaryl such as a benzene or toluene having attached thereto at least one alkyl chain, linear or branched, containing from 5 to 18 and preferably from 6 to 14 carbon atoms, and x is from 4 to 20 and preferably 6 to 16.

(b) Dipolyethoxylated amines having the following formula:

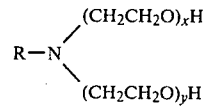

wherein R is an alkyl, linear or branched containing from 6 to 25 and preferably from 8 to 20 carbon atoms, N is nitrogen or an alkylaryl such as benzene, toluene or xylene having attached thereto at least one alkyl group containing from 6 to 25 and preferably 8 to 20 carbon atoms, x and y are each 1 to 12 and the sum of x and y is from 2 to 24.

(c) A dipolyethoxylated alkyl catacol having the following formula:

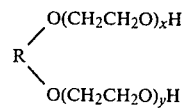

wherein R is benzene or alkylaryl, such as benzene or toluene having attached thereto a linear or branched alkyl having from 6 to 25 and preferably 8 to 20 carbon atoms, x and y are each 1 to 12 and the sum of x and y is from 2 to 24.

(2) A class of surfactants suitable for use in formations whose temperature is no greater than about 160° F., but which can be utilized in formations containing relatively high salinity water, i.e., water whose salinity is as high as 240,000 parts per million total dissolved solids, is an alkylpolyethoxy sulfate or alkylarylpolyethoxy sulfate having the following formula:

RO(CH$_2$CH$_2$O)$_x$SO$_3$M wherein R is an alkyl or alkylaryl having from 6 to 24 and preferably from 8 to 18 carbon atoms in the alkyl chain, x is a number from 2 to 18 and preferably from 2 to 8, and M is a monovalent cation including sodium, potassium, lithium, or ammonium. The foregoing polyethoxy sulfate surfactant is quite effective in high salinity formations including hard brine formations, e.g. formations containing water whose salinity is as high as 200,000 parts per million total dissolved solids which may include as high as 10,000 parts per million divalent ions such as calcium and magnesium; however, this surfactant is prone to hydrolysis at elevated temperatures and so should not be used if the formation's temperature exceeds about 160° F.

(3) An especially preferred surfactant for high temperature, high salinity formations, is an alkylpolyalkoxyalkylene sulfonate or alkylarylpolyalkoxyalkylene sulfonate having the following formula:

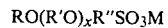

RO(R'O)$_x$R"SO$_3$M wherein R is an alkyl, linear or branched, having from 6 to 24 and preferably from 12 to 20 carbon atoms, or an alkylaryl such as benzene or toluene having attached thereto at least one alkyl group, linear or branched, and containing from 6 to 20 and preferably 6 to 16 carbon atoms, R' is ethylene or a mixture of ethylene and higher alkylene such as propylene with relatively more ethylene than higher alkylene, x is a number including fractional numbers from 2 to 18 and preferably from 2 to 8, R" is ethylene, propylene, hydroxypropylene, or butylene and M is a monovalent ion, preferably sodium, potassium, lithium or ammonium.

Any of the foregoing surfactants may be employed as substantially the only surfactant present in the surfactant fluid used in the process of this invention, or may be used in combination with other surfactants. For example, the use of primary anionic surfactants, usually organic sulfonates such as petroleum sulfonates, alkyl sulfonates or alkylaryl sulfonates in combination with any of the above described more soluble synthetic surfactants, is a cost effective method for conducting surfactant waterflooding operations in a high salinity formation. Organic sulfonates are particularly effective and the preferred organic sulfonates for use in the process of this invention are those which are at least partially water soluble, preferably being comprised of species of varying equivalent weight over a relatively broad range and having an average equivalent weight in the range of about 350 to about 450. Alkyl or alkylaryl sulfonates having from 6 to 20 and preferably from 8 to 18 carbon atoms in the alkyl chains may also be employed. Ordinarily the water soluble sodium, potassium, lithium or ammonium salt of the above described organic sulfonate are utilized.

The concentration of the synthetic surfactants described above will ordinarily be in the range of from about 0.10 to 10.0 and preferably from about 0.5 to 3.0 percent by weight. In the instance of using a combination of surfactants such as is described in the foregoing paragraph, the concentration of the primary anionic organic sulfonate surfactant will be from 0.1 to 10.0 and preferably from 1.0 to 5.0 percent by weight. It is customary to maintain the ratio of primary anionic organic sulfonate surfactant to the solublizing surfactant in the range of 0.1 to 10.0 and preferably from 0.2 to 3.0.

The total pore volume of surfactant solution employed in the process of this invention is approximately the same as is used in conventional processes described in the literature and are generally in the range of from 0.1 to 1.0 and preferably from 0.20 to 0.50 pore volumes. Similarly, it is customary in state-of-the-art surfactant waterflooding processes to follow the surfactant solution with a mobility-controlling fluid comprising water having dispersed or dissolved therein a sufficient amount of a viscosifying material to increase the viscosity of the fluid so as to insure a favorable mobility ratio between that fluid and the previously-injected surfactant fluid. Ordinarily from about 100 to about 2,000 and preferably from about 500 to 1500 parts per million hydrophilic polymers such as partially hydrolyzed polyacrylamides, copolymers of acrylamide and acrylic acid, as well as biopolymers such as polysaccharides which are commercially available for this purpose, achieve the desired favorable mobility ratio between the mobility fluid and the previously injected surfactant fluid. From 0.1 to 1.0 and preferably 0.20 to 0.50 pore volumes of mobility-controlling fluid is ordinarily employed and should be employed in a preferred embodiment of this process. The mobility-controlling fluid is injected immediately after all of the slugs of surfactant and fresh water solutions of polymer have been injected. Field brine is injected next to displace mobilized oil and the previously injected fluids through the formation.

In applying the process of this invention, the total quantity of surfactant fluid is not injected into the formation in a single, large slug as is common practice in surfactant waterflooding operations described in the literature pertaining to surfactant waterflooding. Rather, the surfactant fluid is injected in relatively small slugs, separating the slugs of surfactant fluid by injecting similarly small slugs of fresh water solutions of polymer containing little or no surfactant, said slugs of fresh water polymer solution having salinities no greater than 10,000 and preferably no greater than 1000 parts per million, which is substantially less than the salinity of the formation water or the surfactant fluid.

In applying this process to high salinity formations, where surfactant loss is especially acute and where this process is particularly effective, the particular surfactants will be tailored and if a blend of surfactants is employed, the blend will be balanced so the surfactant is slightly soluble in water having a salinity about equal to the formation water, and additionally so the surfactant reduces the interfacial tension between the formation petroleum and the formation brine to a value less than about 100 and preferably less than about 10 millidynes per centimeter. Once the preferred surfactant species and/or blend is identified, it will be dispersed and/or dissolved in an aqueous fluid having a salinity which is from 50 to 100 and preferably from 80 to 100 percent of the salinity of the formation water.

The salinity of the polymer-containing isolation slugs injected sequentially with the slugs of saline surfactant fluid should be no greater than about 10,000 parts per million total dissolved solids and preferably no greater than 1000 parts per million total dissolved solids, in order to achieve a maximum recapture of surfactant absorbed by the formation matrix and/or contained in stagnant or dead end pores. The slugs of polymer solution contain from 100 to 2000 and preferably from 500 to 1500 parts per million of a hydrophilic polymer. Suitable polymers for this use include polyacrylamide, partially hydrolyzed polyacrylamide, copolymers of acrylamide and acrylic acid, and polysaccharides. Examples of commercially available polymers for this purpose are Cyanatrol®, available from American Cyanamid, Pusher® from Dow Chemical, and Kelzan® (now sold under tradename of Xanflood®) brand of biopolymers, available from Kelco Co.

The pore volumes of polymer containing low salinity water employed sequentially with the separate slugs of surfactant fluid ordinarily parallel the pore volumes of surfactant fluid used. In one preferred embodiment, the pore volumes of surfactant fluid and pore volume of polymer fluid injected sequentially therewith will be about equal, although this is not absolutely essential. The pore volume of each low salinity polymer fluid slug should be from 0.5 to 5.0 and preferably from 1.0 to 2.0 times the pore volume of the slug of surfactant fluid injected immediately therebefore.

Similarly, a convenient and preferred method of operating according to the process of this invention comprises injecting slugs of surfactant fluid which are about equal to one another, although this is not necessary, and it may in fact be desirable in certain applications to taper or vary the pore volume of succeeding slugs of surfactant fluid during the course of injecting all of the surfactant fluid into the formation.

FIELD EXAMPLE

For the purpose of illustrating a preferred mode of operating according to the process of this invention, the following pilot field example is offered. This is not intended to be in any way limitative or restrictive of the scope of this invention, however; rather it is offered only for the purpose of providing a complete disclosure including best modes of operating according to this process.

A subterranean, petroleum-containing formation having a porosity of 25 percent and a permeability of 500 md, has been exploited by primary production and secondary recovery, i.e., conventional waterflooding. At the conclusion of the waterflooding phase, the oil saturation remaining in the formation is about 35 percent and about 45 percent of the oil originally in place in the formation has been recovered. The salinity of the water present in the formation at the time waterflooding operations must be terminated is about 100,000 parts per million total dissolved solids including 10,000 parts per million divalent ions, which are principally calcium plus small amounts of magnesium. The temperature is about 180° F. (82° C.). Because of the high salinity and high temperature of this formation, the preferred surfactant is identified as a sodium nonylbenzenetriethoxypropylene sulfonate. The surfactant is quite effective when used as the only surfactant present in a fluid having a salinity of about 90,000 parts per million total dissolved solids, and an optimum concentration is identified as about 1.6 percent by weight (16 kilograms/meter$^3$).

The formation has been exploited by means of a plurality of five-spot patterns but only one unit is employed in this pilot example. The producing wells are located at the corners of a square and are approximately 100 feet apart, with the injection well in the center of the pattern. The formation thickness is approximately 42 feet and it is known that the volumetric efficiency of this pattern in a fluid displacement process is approximately 70 percent. Accordingly, the pore volume for this pattern which will be affected by injected fluids in the central injection well will be approximately $100 \times 100 \times 42 \times 0.25 \times 0.7 = 73,500$ cubic feet. One pore volume is approximately 550,000 gallons. A total of 30 percent pore volume of surfactant, or 165,000 gallons, is employed in this pilot example.

In order to achieve the maximum benefit of the process of this invention, it is decided that the above described quantity of surfactant fluid will be injected into the formation in five approximately equal slugs, each comprising 33,000 gallons of surfactant fluid. Thus the surfactant injection sequence will involve injecting 33,000 gallons of surfactant fluid containing 1.6 percent by weight of the above described surfactant, the salinity of the fluid being about 90,000 parts per million total dissolved solids, followed by injection of about 33,000 gallons of polymer fluid prepared by mixing 900 parts per million Kelzan®, a biopolymer, in water whose salinity is about 1,000 parts per million total dissolved solids, followed by another 33,000 gallon slug of surfactant etc., until the entire 165,000 gallons of surfactant fluid has been injected. After the last slug of the surfactant fluid and last slug of fresh water polymer fluid is injected, a mobility buffer fluid is injected as is commonly practiced in the art. This fluid comprises approximately 200,000 gallons of water whose salinity is about 900 parts per million total dissolved solids, containing about 1100 parts per million of a partially hydrolyzed acrylamide hydrophilic polymer. After the last of the polymer fluid is injected, field brine containing 100,000 parts per million total dissolved solids is injected to displace all of the previously-injected fluids through the formation, with petroleum being recovered from the production wells until the fluid being recovered at those wells rises to a water cut in excess of 98 percent, indicating that all of the oil that can be recovered economically by tertiary means has been recovered from the formation.

EXPERIMENTAL SECTION

For the purpose of further illustrating and disclosing the novel process of this invention, and further to illustrate how the invention can be applied to particular environments and to illustrate the magnitude of results achieved from application thereof, the following described laboratory work was performed and the observed results are described below.

Two surfactant floods were performed on six inch long Berea formation cores using a single surfactant-containing aqueous fluid. In both of the tests, the surfactant employed was a sodium dodecylbenzenepolyethoxyethylene sulfonate containing an average of 4.25 moles of ethylene oxide per mole of surfactant. The concentration of surfactant was 1.5 percent by weight (15 kilograms/meter$^3$). The salinity of the surfactant fluid was approximately 90,000 parts per million total dissolved solids. These tests were conducted in connection with a study of a possible field candidate for surfactant flooding containing water whose salinity was in the range of from 85,000 to 100,000 parts per million (85 to 100 kilograms/meter$^3$) total dissolved solids.

In both of the laboratory experiments described below, the cores were mounted in conventional laboratory flooding equipment, saturated with brine, then oil saturated, and next waterflooded to an oil saturation value approximating that existing at the conclusion of waterflooding in an oil formation. The surfactant fluid was then injected into the cores, followed by injecting a mobility-controlling fluid comprising 1000 parts per million of a polysaccharide in water, and displaced by field brine having a salinity in the range of 85 to 100,000 parts per million total dissolved solids, until the water cut of the fluid being recovered from the core had risen to a value of about 99% signifying completion of the test.

In the first experiment, a single 0.33 pore volume slug of the above described saline surfactant-containing aqueous fluid was injected into the core as described above, followed by injecting a 0.33 pore volume slug of polymer in brine. The tertiary oil recovery was about 59 percent of the oil in place in the core. In the second run, the same total amount of surfactant was used, except that it was injected in three separate, approximately equal volume slugs. Between surfactant slugs, two slugs of polymer fluid, one 0.22 pore volume and the second 0.11 pore volume, were injected. The polymer fluid comprised water whose salinity was less than 100 parts per million total dissolved solids and contained 1000 parts per million Xanflood®, a bioploumer sold by Kelco Co. The second run was otherwise identical to the first run. The tertiary oil recovered in this second run was 66.1 percent, or 12 percent more than was recovered in the comparison base run.

The foregoing clearly illustrates how significantly more oil can be recovered using a plurality of slugs of surfactant fluid separated by slugs of low salinity polymer fluid containing no surfactant. As discussed earlier herein, it is believed that one or both of the mechanisms may be responsible for this improvement. In any event, it is clearly evident that significantly more oil can be recovered by surfactant waterflooding according to the process of this invention than when a single large slug of surfactant fluid is injected into the formation and followed by a single slug of polymer fluid as is commonly taught in prior art references dealing with tertiary recovery.

We have found that if a single, large slug of surfactant and polymer are followed by a single, large slug of fresh water equivalent in volume to the plurality of small slugs of fresh water, an increase in tertiary oil recovery is noted. The magnitude of the increase is less than that observed using plurality of slugs according to this invention, however. Also, the final oil recovery (at maximum water cut) is only achieved after injecting greater total quantities of liquid than is needed using our invention, which means the economic end of an enhanced oil recovery process will come at a much later time using a single terminal fresh water slug than in applying this invention. In a commercial field application, the difference in time to reach the economic cut-off point may be in the range of several years, which makes this process much more economical. It must also be understood that if the surfactant fluid and low salinity polymer fluid are mixed on the surface and injected as a large, single slug, the oil recovery effectiveness will be greatly reduced, since the fluid salinity and surfactant concentration would both be reduced below the optimum level.

While the foregoing disclosure of the process of this invention has been described in a number of specific illustrative embodiments, this is not in any way limitative or restrictive of the true scope of this invention. Furthermore, while explanations have been offered for the improvements observed in applying this process, it is not necessarily represented that these are the only or even the primary mechanisms responsible for the improvements achieved. It is our intention that our invention be limited and restricted only by those limitations and restrictions appearing in the claims appended immediately hereinafter below.

We claim:

1. A method of recovering petroleum from a subterranean, petroleun-containing, permeable formation penetrated by at least one injection well and by at least one production well, said formation containing water having a salinity in excess of about 20,000 parts per million total dissolved solis, comprising injecting into the formation a predetermined volume of an aqueous, saline surfactant fluid, said surfactant being slightly soluble in a fluid having a salinity of from 50 to 100 percent of the salinity of the water present in the formation, and reducing interfacial tension between the petroleum and water to a value less than 100 millidynes/centimeter, said surfactant fluid being injected at the injection well and displacing petroleum in the formation toward the production well from which it is recovered to the surface of the earth, wherein the improvement comprises: injecting from 2 to 15 discrete slugs of the surfactant fluid into the formation and separating successive slugs of surfactant fluid from one another by injecting sequentially therewith, separate isolation slugs consisting of fresh water polymer solutions having salinity less than 10,000 parts per million total dissolved solids, and containing a predetermined amount of a hydrophilic polymer.

2. A method as recited in claim 1 wherein the number of surfactant slugs is from 3 to 6.

3. A method as recited in claim 1 wherein the volume of each surfactant slug is at least 5 percent of the total volume of surfactant fluid.

4. A method as recited in claim 3 wherein the volume of each surfactant slug is at least 10 percent of the total volume of surfactant fluid.

5. A method as recited in claim 1 wherein the salinity of the isolation slugs of low salinity, polymer-containing fluid is less than 1000 parts per million total dissolved solids.

6. A method as recited in claim 1 wherein the volume of each isolation slug of polymer fluid is from 0.5 to 5.0 times the volume of the preceeding surfactant slug.

7. A method as recited in claim 6 wherein the volume of each isolation slug of polymer fluid is from 1.0 to 2.0 times the volume of the preceeding surfactant slug.

8. A method as recited in claim 1 wherein said hydrophilic polymer is polyacrylamide, partially hydrolyzed polyacrylamide, polysaccharide, or a mixture thereof.

9. A method as recited in claim 8 wherein steps (b) and (c) are repeated at least three times.

10. A method as recited in claim 1 wherein the concentration of polymer is from 100 to 2000 parts per million.

11. A method as recited in claim 10 wherein the concentration of polymer is from 500 to 1500 parts per million.

12. A method as recited in claim 10 wherein the concentration of polymer is from 500 to 1500 parts per million.

13. A method as recited in claim 1 wherein said hydrophilic polymer is polyacrylamide, partially hydrolyzed polyacrylamide, polysaccharide, or a mixture thereof.

14. A method as recited in claim 1 wherein the concentration of polymer is from 100 to 2000 parts per million.

15. A method as recited in claim 1, wherein the isolation slugs comprise fresh water solutions of polymer containing little or no surfactant.

16. A method as recited in claim 15, wherein the fresh water polymer solutions contain no surfactant.

17. A method as recited in claim 1, wherein the isolation slugs consist of fresh water polymer solutions having salinity less than 1,000 parts per million total dissolved solids.

18. A method of recovering petroleum from a subterranean, petroleum-containing, permeable formation penetrated by at least one injection well and by at least one production well, each well being in fluid communication with at least a portion of the formation, said formation containing water of known or determinable salinity in the range of from 20,000 to 240,000 parts per million total dissolved solids, comprising
 (a) injecting from 0.01 to 0.50 pore volumes of an aqueous, saline, surfactant-containing fluid into the formation via the injection well, said fluid containing from 0.1 to 10.0 percent by weight of a surfactant which is slightly soluble in said fluid and which reduces the interfacial tension between formation petroleum and said fluid to a value less than 100 millidynes per centimeter,
 (b) injecting from 0.01 to 1.00 pore volumes of an isolation slug consisting of a fresh water polymer solution having a salinity which is no greater than 10,000 parts per million total dissolved solids, containing an effective amount of a hydrophilic polymer, into the formation to displace the surfactant fluid away from the injection well;
 (c) repeating steps (a) and (b) at least once;

(d) recovering petroleum displaced by the previously injected fluids from the formation via the production well.

19. A method as recited in claim 18 wherein the volume of surfactant fluid is from 0.05 to 0.20 pore volumes.

20. A method as recited in claim 18 wherein the volume of the isolation slug is from 0.05 to 0.50 pore volumes.

21. A method as recited in claim 18 wherein the number of slugs of surfactant fluid injected into the formation is from 2 to 15.

22. A method as recited in claim 18 wherein the number of surfactant slugs is from 3 to 6.

23. A method as recited in claim 18 wherein the salinity of the isolation slug is no more than 1,000 parts per million total dissolved solids.

24. A method as recited in claim 18 wherein the total concentration of surfactant in the surfactant-containing fluid is from 0.5 to 3.0 percent by weight.

25. A method as recited in claim 18, wherein the isolation slugs comprise polymer dissolved in water having salinity no greater than 10,000 parts per million total dissolved solids and contain little or no surfactant.

26. A method as recited in claim 25, wherein the isolation slugs contain no surfactant.

27. A method as described in claim 18, wherein the isolation slugs consist of fresh water polymer solutions having salinity less than 1,000 parts per million total dissolved solids.

* * * * *

UNITED STATES PATENT AND TRADEMARK OFFICE
CERTIFICATE OF CORRECTION

PATENT NO. : 4,266,611

DATED : 5-12-81

INVENTOR(S) : Issam S. Bousaid and Benny K-C Ho

It is certified that error appears in the above-identified patent and that said Letters Patent are hereby corrected as shown below:

Col. 11, line 45, "solis," should read -- solids, --

Col. 14, line 13, "described" should read -- recited --

Col. 12, lines 25-27 are duplicates of lines 22-24 and should be omitted.

On the cover sheet "27 claims" should be --26 claims--.

Signed and Sealed this

Third Day of November 1981

[SEAL]

Attest:

Attesting Officer

GERALD J. MOSSINGHOFF

Commissioner of Patents and Trademarks